United States Patent [19]

Koscinski

[11] 4,047,759

[45] Sept. 13, 1977

[54] COMPACT SEAT SUSPENSION FOR LIFT TRUCK

[75] Inventor: Daniel P. Koscinski, Chardon, Ohio

[73] Assignee: Towmotor Corporation, Mentor, Ohio

[21] Appl. No.: 703,996

[22] Filed: July 9, 1976

[51] Int. Cl.² .......................... A47C 3/22; A47C 3/30
[52] U.S. Cl. ................................. 297/346; 248/399
[58] Field of Search .............. 248/157, 161, 397, 398, 248/419, 420, 399, 400; 297/326, 345, 346, 347, DIG. 3

[56] References Cited

U.S. PATENT DOCUMENTS

| 2,633,897 | 4/1953 | Moore | 297/326 |
|---|---|---|---|
| 3,198,473 | 8/1965 | Holz | 248/399 |
| 3,235,245 | 2/1966 | Castelet | 5/35 X |
| 3,268,200 | 8/1966 | Eicher | 248/399 |
| 3,319,920 | 5/1967 | Freedman et al. | 248/399 |
| 3,325,136 | 6/1967 | Radke et al. | 248/400 |
| 3,335,996 | 8/1967 | Hall et al. | 248/400 |
| 3,572,828 | 3/1971 | Lehner | 248/399 X |
| 3,601,351 | 8/1971 | Ambrosius | 248/400 |
| 3,602,475 | 8/1971 | Sedlock | 248/399 |
| 3,797,798 | 3/1974 | Magruder | 248/399 |

FOREIGN PATENT DOCUMENTS 2,424,794  12/1974  Germany .................. 248/399

Primary Examiner—J. Franklin Foss
Attorney, Agent, or Firm—Phillips, Moore, Weissenberger, Lempio & Majestic

[57] ABSTRACT

A seat suspension system for lift trucks and other vehicles having a low or compact profile is provided. A seat framework is adjustably slidably mounted upon supporting structure of the vehicle within the operator's compartment. The framework includes a U-shaped base component, a pair of upright support components, box-like lower seat components, and back rest components. The lower seat components are suspended from the upright components by opposed pairs of parallel links and the links are biased upwardly by a pair of torsion springs disposed between the upright components. The lower seat components and back rest components are provided with planar sinusoidal springs and a damping device controls the up-and-down motion of the seat framework relative to the vehicle support structure.

13 Claims, 2 Drawing Figures

COMPACT SEAT SUSPENSION FOR LIFT TRUCK

BACKGROUND OF THE INVENTION

The present invention relates to a seat including a suspension system for lift trucks and other vehicles which must operate in low-overhead environments. In particular, the invention relates to a low profile spring suspended seat for a lift truck which provides superior support and resiliency characteristics in an unusually compact structural package.

Most modern commercial vehicles are provided with operator seats consisting of various arrangements of coils, springs and padding which compress, in linear fashion, with downward thrusts of an operator's body during use of the vehicle. The size and spring coefficients of such coil springs are usually traded off against operator comfort to provide seats with reasonable dimensions and ride characteristics.

However, such conventional systems are often impractical for use in lift trucks and other vehicles which often must operate in very low-overhead environments such as mine shafts, warehouse storage areas and the like. In such environments, operator seats must have very low profile configurations and this is usually achievable only at the expense of operator comfort and support. While low overhead environments serve as a consideration for desiring compactness of seats, this is not the only consideration. Actually, compactness is desirable with application to standard lift trucks and the intention is to meet the needs of standard lift trucks as well. The vertical dimension between the top of the vehicle body and the top of the overhead guard, less than the seated human operator height allowance, determines the maximum vertical height of the lift truck seat. Since the height available with lift trucks of less than 10,000 pounds capacity is so small, many of these lift trucks do not use suspension seats. Some use merely foam filled cushions.

Some attempts have been made in the prior art to address the pursuit of compact, yet resilient and supportive vehicle seat assemblies. Examples of such prior art attempts are found in U.S. Pat. Nos. 3,268,200; 3,319,920; 3,335,996; 3,325,136; 2,562,041; 3,572,828; and 3,601,351, to Eicher; Freedman et al; Hall et al; Radke, et al; Keller, et al; Lehner; and Ambrosino, respectively. None of such patents, however, disclose inventions specifically intended to provide comfortable, resilient support for the operator of a lift truck with a compact, low profile seat assembly including both flat and torsion springs in series combination coupled with parallel disposed frame support links.

The present invention provides such a lift truck seat suspension and does so with a minimum of expensive structural components and assembly and maintenance requirements. The resultant seat suspension is both inexpensively fabricatable and highly efficient in operation.

SUMMARY AND OBJECTS OF THE INVENTION

The instant invention comprises a seat suspension for a lift truck. More particularly, the suspension includes a framework adjustably positionable with respect to the truck body. The framework includes a U-shaped base component, upright support components, and lower seat and back rest components. The seat components are biased in an upward direction by means of torsion springs acting upon opposed pairs of parallel links which are connected between the upright components and the lower seat components. Damping means are provided between the U-shaped base component and the lower seat components.

It should be noted in the application that maintaining the seat parallel to its original position throughout its path of travel is accomplished by means of equally opposed parallel links. However, it may become desirable later to make these parallel links slightly unequal in length to cause the seat to rock slightly back and forth as it travels up and down. This rocking motion may be used advantageously to offset vehicle oscillations transmitted to the operator through the pitch mode. This extra degree of freedom should enhance the vibration isolation attained by tuning the two degree of freedom system for the bounce mode.

The suspension seat characteristic which used with this invention, other than its compactness is that it is expressly modeled as a two degree of freedom system. It differs from the vibration absorber concept in that the absorber mass is placed between the exciting surface and mass to be isolated. It also differs from the typical automotive suspension system where the softer spring is placed between the absorber mass (wheel) and mass to be isolated (body) and the stiffer spring (pneumatic tire) between the exciting surface (road) and absorber mass. In the seat suspension system the softer spring is placed between the exciting surface (base component) and absorber mass (bottom cushion frame and backrest components) and the stiffer spring (bottom cushion foam and flat sinusoidal springs) between the absorber mass and mass to be isolated mass (human operator).

The primary object of the present invention is to provide a seat suspension for a lift truck which operates in low-overhead environments.

Another object of the present invention is to provide such a seat suspension which includes tuned torsion and flat springs.

A further object of the present invention is to provide such a seat suspension including opposed pairs of parallel links biased by means of torsion springs.

It is a still further object of this invention to provide such a seat suspension having parallel links located outboard of the seat so as to achieve a maximum ratio of cushion deflection to unloaded bottom cushion height.

A still further object of the present invention is to provide such a seat suspension including damping means for controlling the rate of response of such suspension to imposed forces.

Other objects and advantages of the present invention will become apparent from the following description and drawings.

DETAILED DESCRIPTION

Figure 1:
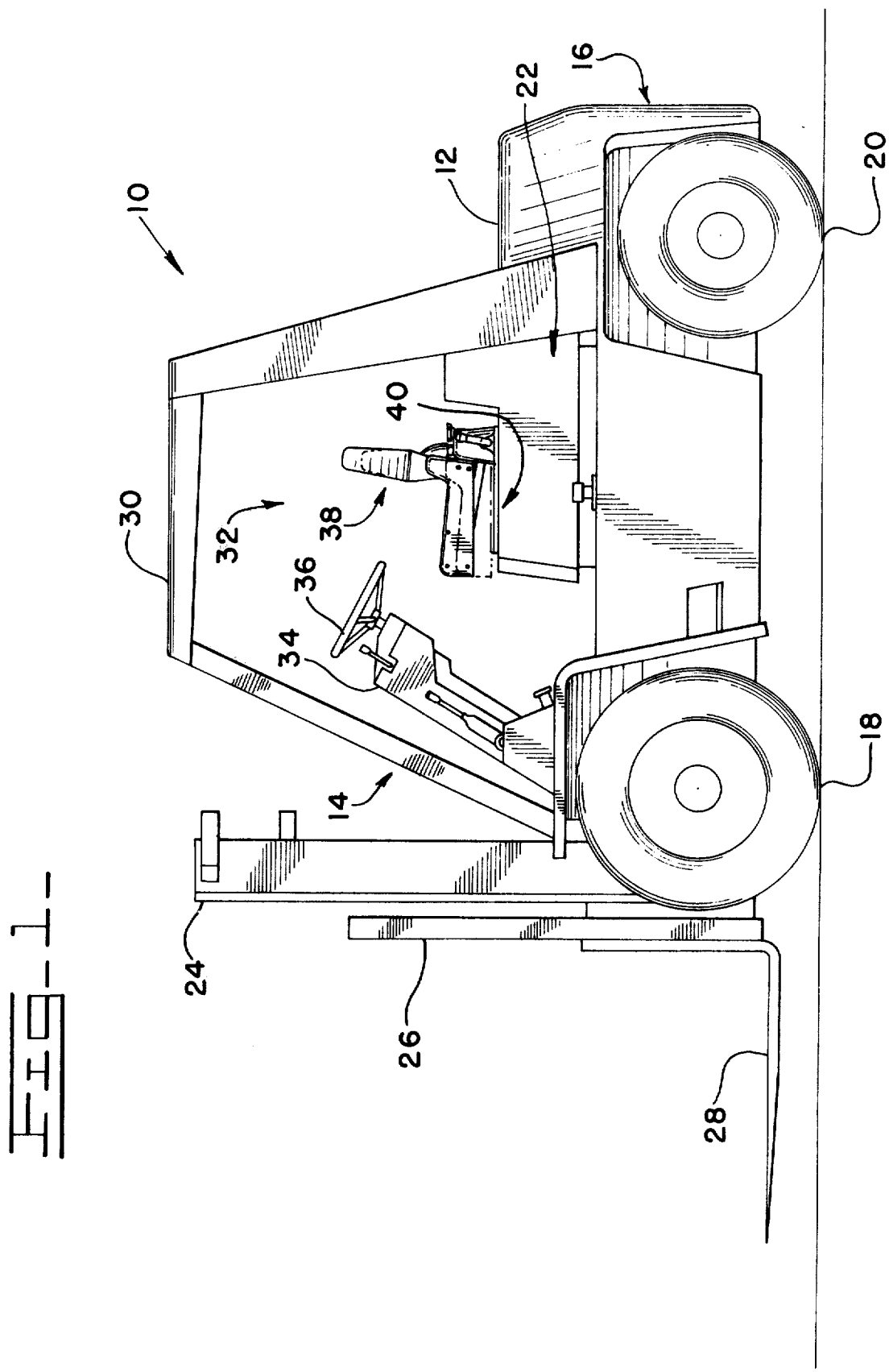
FIG. 1 is a side elevation view of a lift truck showing the operative orientation of the instant seat suspension.

Referring to FIG. 1, a lift truck vehicle is shown generally at 10. The lift truck includes a body 12 having a front end 14 and a rear end 16. A motor compartment 22 houses source of motive power (not shown) for driving front wheels 18, while rear wheels 20 are steerable. The lift truck also includes a carriage 26 which is mounted upon a tiltable mast assembly 24 and which includes a pair of lift forks 28.

The lift truck includes an operator's compartment or station 32 having a control console 34, steering wheel 36, and seat support structure 40. The compartment is protected from falling objects by means of suitable overhead guard structure 30.

Figure 2:
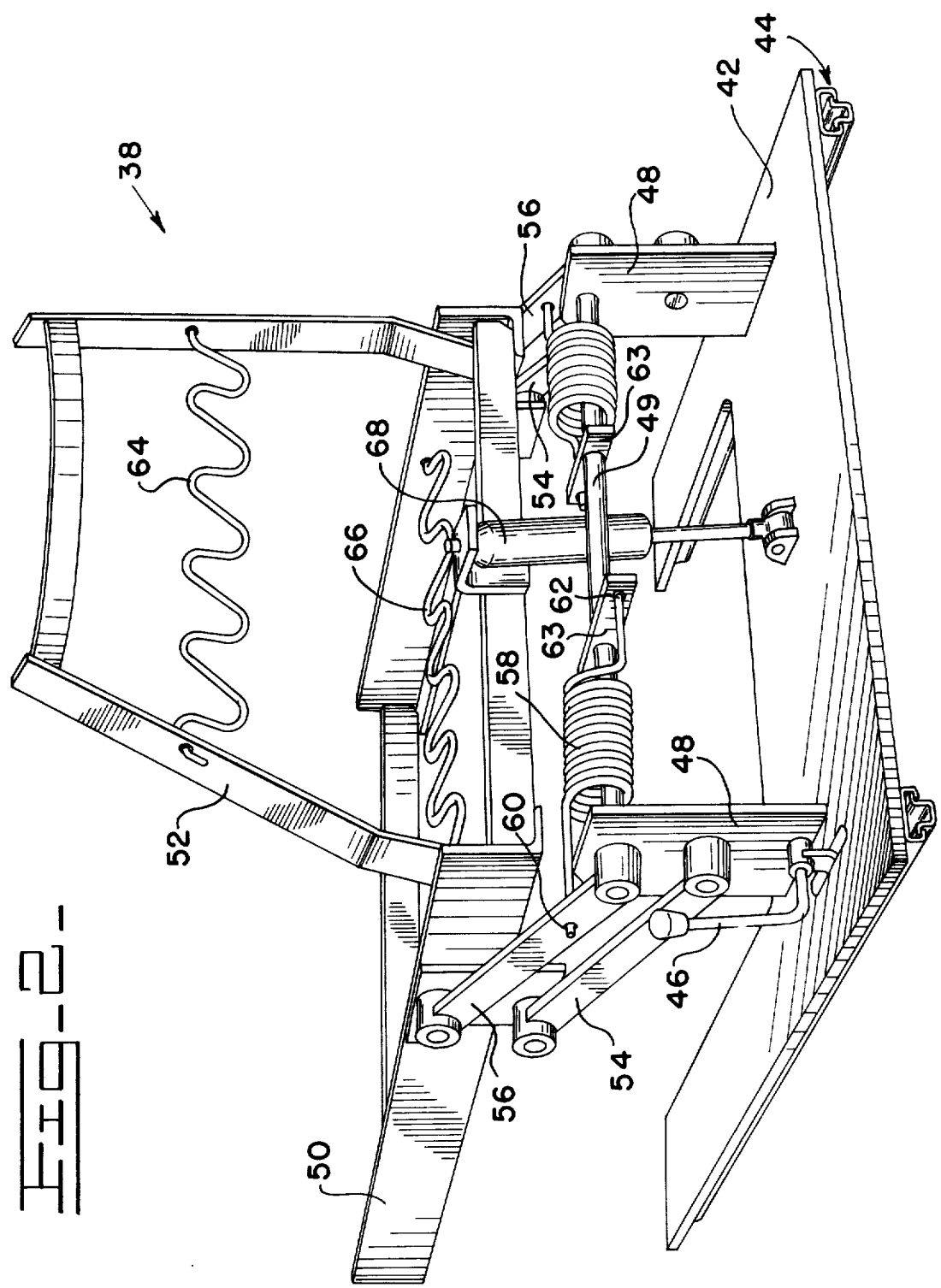
FIG. 2 is an enlarged isometric view of the instant seat suspension illustrating the major components thereof.

With particular reference to FIG. 2, the seat assembly 38 will be seen to include a U-shaped base plate or component 42 slidably mounted, via tracks 44, upon the support structure 40 (not shown in FIG. 2). The position of the base component, consequently the entire seat assembly, is selectively regulatable by means of a conventional catch and lever assembly 46 which acts upon the tracks 44.

The assembly also includes a pair of spaced-apart upright support components 48, welded or otherwise affixed to the base component 42. The uprights support a shaft 49 as well as two opposed pairs of upper and lower parallel link members 56, 54 respectively. The pairs of parallel link members are connected between the upright components and box-like lower seat frame components 50 and are located outboard of the seat. The links 54, 56 maintain the lower seat frame parallel to the base component 42 during upward and downward movements of the components 50.

A back rest frame component 52 is attached substantially normally to the lower seat components 50. Both the lower components 50 and the back rest components are provided with laterally traversing sinusoidal flat springs 66, 64, as shown. Such springs provide resilient support for the usual padding elements (not shown) used in vehicle seats. Also connected between the lower seat components 50 and the base component is a damping device; 68 i.e., a piston and cylinder or the like, for retarding the rate of response of the seat assembly to imposed forces.

While a piston type of shock absorber 68 is shown, alternative damping means could be used. For example, a rotational type of damper (not shown) with an external reservoir (not shown) to dissipate heat and allow for a more compact and neater design could be used. It should be noted that some damping is provided within the seat cushion itself which varies with the type, density and composition of the foam material used therein. Thus, it is possible to in this manner vary the magnitude of the damping coefficient between the absorber mass and the operator.

Disposed about the shaft 49 are a pair of relatively stiff axially spaced torsion springs 58. One end of each such spring is attached, as at 62, to the shaft 49 via a suitable extension bracket 63 which can be adjusted to apply a preload force. The other end of each such spring is passed through an aperture 60 provided in each of the upper parallel link components 56. The spring coefficients and dimensions of the sinusoidal and torsion springs are selected and matched for given expected operating parameters such as operator weight and the condition of the terrain over which the vehicle will travel.

It is to be understood that while helical coil torsion springs have been described, other types of spring means may be substituted therefor. For example, torsion bars or helical coil compression springs could also be used.

In operation, downwardly applied forces cause movements of the components 50 which are transmitted to the link components 54, 56 and torsion springs 58. Such torsion springs wind and absorb energy with each such movement and exert reaction forces upon the link components which tend to urge the seat components 50 upwardly. The torsion springs, being disposed laterally beneath the seat components 50 instead of normally with respect there to, take upon less space than the usual coil springs and permit a compact, low-profile seat structure.

While springs are shown and described it is to be understood that torsion bars could be substituted therefor to perform the above described spring means function.

If desired the parallel links 54, 56 may be made of slightly unequal length so that a slight rocking motion will be imparted to the seat as it travels up and down under the weight of the operator. This slight back and forth rocking motion may be used advantageously to offset vehicle oscillations transmitted to the operator through the pitch mode.

It is to be understood that the foregoing description is merely illustrative of a preferred embodiment of the invention, and that the scope of the invention is not to be limited thereto, but is to be determined by the scope of the appended claims.

What is claimed is:

1. In a lift truck vehicle having a mast assembly, a carriage for lifting loads, and an operator's station, a seat assembly comprising; a seat, a base component mounted on a seat supporting surface, a pair of spaced apart upright components affixed to and extending normally from said base component, lower seat components, at least one pair of parallel disposed link components connected between said lower seat components and said upright components, said link components being located outboard of said seat so as to allow said seat to move in close proximity to said seat supporting surface, shaft means extending between and connected to said pair of upright components, and spring means connected to said shaft means to apply force to one of said at least one pair of link components for urging said lower seat components away from said base component.

2. The invention of claim 1 wherein said base component is mounted for slidable movement with respect to said operator's station upon track means.

3. The invention of claim 2 wherein manually actuated lever and catch means are mounted on said seat assembly for acting upon said track means to selectively control the position of said base component with respect to said operator's station.

4. The invention of claim 1 wherein damping means are connected between said seat components and said base component for retarding the rate of response of said seat components to forces imposed thereupon.

5. The invention of claim 1 wherein said base component is a generally U-shaped plate, and dimensioned whereby said seat component may travel within the space defined thereby the allow the seat component to travel in close proximity to the seat supporting surface.

6. The invention of claim 1 wherein said lower seat components comprise four structural members arranged in box-like fashion and wherein at least one flat sinusoidal spring is connected between two of said four structural members.

7. The invention of claim 6 wherein said seat assembly further includes back rest components attached substantially normally with respect to said lower seat components, said back rest components including at least two structural members, and at least one flat sinusoidal spring is connected between said at least two structural members.

8. The invention of claim 1 wherein said spring means comprise torsion springs.

9. The invention of claim 8 wherein said torsion springs are two in number and are mounted about said shaft means, said torsion springs being axially spaced apart upon said shaft means and connected thereto by means of brackets extending from and affixed to said shaft means.

10. The invention of claim 4 wherein said damping means includes a piston and a cylinder and one of said piston or cylinder is pivotally mounted upon said base component.

11. The invention of claim 9 wherein there are two opposed pairs of upper and lower parallel disposed link components and wherein one of said two torsion springs is connected to each of said upper link components.

12. The invention of claim 11 wherein said assembly includes a seat and wherein each pair of parallel link components comprises links of unequal length so that a rocking motion is imparted to said seat under motion imposed by an operator.

13. The invention of claim 1 wherein said link components are straight, elongated members.

* * * * *